United States Patent [19]

Oboza et al.

[11] Patent Number: 5,202,768
[45] Date of Patent: Apr. 13, 1993

[54] CRT FACE PANEL CENTERING APPARATUS

[75] Inventors: Andrew J. Oboza, Niles; Vincent W. Skowronski, Chicago, both of Ill.

[73] Assignee: Zenith Electronics Corporation, Glenview, Ill.

[21] Appl. No.: 814,736

[22] Filed: Dec. 27, 1991

[51] Int. Cl.⁵ .............................................. H04N 5/65
[52] U.S. Cl. ..................................... 358/247; 358/248; 358/254
[58] Field of Search ............... 358/245, 254, 247, 248, 358/229

[56] References Cited

U.S. PATENT DOCUMENTS

| | | | |
|---|---|---|---|
| 2,560,336 | 7/1951 | Fisch | 358/245 |
| 2,738,500 | 3/1956 | Summerer et al. | 358/248 |
| 3,084,217 | 4/1963 | Fiore et al. | 358/248 |
| 3,146,305 | 8/1964 | Monaco et al. | 358/247 |
| 3,412,203 | 11/1968 | D'Angelo | 358/245 |
| 3,643,020 | 2/1972 | St. George et al. | 358/248 |
| 3,651,257 | 3/1972 | Goetz, Jr. | 358/248 |
| 3,712,958 | 1/1973 | Stute | 358/254 |
| 4,247,871 | 1/1981 | Hirsch et al. | 358/248 |
| 4,360,838 | 11/1982 | Babicz et al. | 358/247 |
| 5,067,022 | 11/1991 | Huerre et al. | 358/248 |

FOREIGN PATENT DOCUMENTS 997389  7/1965  United Kingdom ............... 358/248

Primary Examiner—Stephen Brinich
Assistant Examiner—Thomas L. Stoll

[57] ABSTRACT

Centering members provide for centering the rectangular face panel of a cathode ray picture tube in a cabinet. The centering members have at least three fingers of different lengths for resiliently pressing against the perimeter of a face panel. The centering members thus compensate for variances in the diagonal fit dimensions of face panels.

11 Claims, 2 Drawing Sheets

CRT FACE PANEL CENTERING APPARATUS

BACKGROUND OF THE INVENTION

1. Field of the Invention

This invention relates to cathode ray picture tubes, and is addressed specifically to an improved device for centering picture tubes in the cabinets of television sets and other picture tube displays.

Cathode ray tubes (CRTs), especially those used in large-screen television sets, are bulky and awkward in shape, making them difficult to mount accurately in a cabinet. A CRT mounting and centering system preferably provides for easy, straight-forward installation of the tube. Most important, the system must be able to accommodate and compensate for the variances in the dimensions of rectangular face panels as measured along the diagonal. This dimension is termed the "diagonal fit dimension." By way of example, the variance in diagonal fit dimensions of the face panels of thirty-two inch tubes is in the range of ±0.118 inch. Face panels that measure at the low end of the range are designated as being of minimum diagonal measure, panels that measure at or near the center of the range are designated as being of nominal diagonal measure, and panels that measure at the high end of the range are designated as being of maximum diagonal measure. A face panel centering system must be able to accommodate the complete diagonal dimensional range from minimum to maximum.

The dimensions of cabinets in which CRTs are mounted may also vary, and a centering system that compensates for variances in the diagonal fit dimensions of the face panels preferably compensates for minor variances in the dimensions of the parts of the cabinet that mount the tube.

An additional requirement of a CRT mounting and centering system in strength. For example, the weight of a thirty-two inch tube is about 110 pounds, and the weight is concentrated largely in the face panel section of the tube. A tube centering system must be capable of supporting a face panel of this size and weight during installation of the tube.

2. Related Art

In commonly owned U.S. Pat. No. 4,360,838, there is disclosed an apparatus for mounting rectangular cathode ray picture tubes within the escutcheon of the picture tube cabinet. Cradles in each of the four corners of the escutcheon include guides which extend rearwardly from the opening in the escutcheon for guiding the corners of the face panel of the tube into the escutcheon. Tapered ribs which project from the cradling devices exert a progressively increasing force on the panel. As the corners of the panel are forced into the cradles by the pressure of the escutcheon, the tapered ribs are crushed to conform to the contour of the panel. By this means, slight but significant variances in the diagonal fit dimensions of face panels can be accommodated. A disadvantage inherent in this system lies in the fact that if it is necessary to replace a tube, the mounting system can accomodate tubes having panels of the same or larger diagonal measure, but not panels of smaller diagonal measure.

In U.S. Pat. No. 5,067,022 to Heurre et al, there is disclosed a fascia, or escutcheon, for a television set that includes a mechanism for centering at the four corners of the screen. The fascia has an inner rim which faces and contacts the screen. The centering mechanism comprises elastic tabs which are a part of the fascia and extend from the fascia at each corner, and are symmetrically arranged with respect to a bisector on each corner of the fascia. However, this fascia is operative only after insertion of the tube into the cabinet and is apparently directed toward centering the fascia about the viewing screen rather than centering the tube within the cabinet.

Other related art includes these U.S. Pat. Nos.—
3,142,203 to D'Angelo
3,643,020 to St. George et al
3,651,257 to Goetz
3,712,958 to Stute
4,247,871 to Hirsch

SUMMARY OF THE INVENTION

The subject of the present invention is a centering member for use in centering a cathode ray tube and the face panel thereof within the cabinet of a CRT video device. The centering member comprises a substantially kidney-shaped body, i.e., roughly trapezoidal with rounded corners and the parallel sides thereof exhibiting curvatures of like direction, and composed of elastomeric material, with the body having a greater curvature and a lesser curvature on opposing sides of the body. A plurality of unequal length fingers extend from the lesser curvature. As a result, when the centering member is placed within the cabinet, the fingers of the lesser curvature singly or in combination may engage the edge of the CRT to center the CRT upon insertion of the CRT in the cabinet.

OBJECTS OF THE INVENTION

It is a general object of the invention to provide means for facilitating the manufacture of television sets and other picture tube displays, with consequent cost reductions.

It is an object of the invention to provide an improvement in the means for centering cathode ray picture tubes in display cabinets.

It is a further object of the invention to provide a tube centering system that compensates for variances in the diagonal fit dimensions of face panels.

It is another object of the invention to provide a face panel centering system that will compensate for variances in cabinet dimensions.

BRIEF DESCRIPTION OF THE DRAWINGS

The features of the present invention which are believed to be novel are set forth with particularity in the appended claims. The invention, together with further objects and advantages thereof, may best be understood by reference to the following description taken in conjunction with the accompanying drawings, in the several figures of which like reference numerals identify like elements, and in which:

DESCRIPTION OF THE PREFERRED EMBODIMENT

Figure 1:
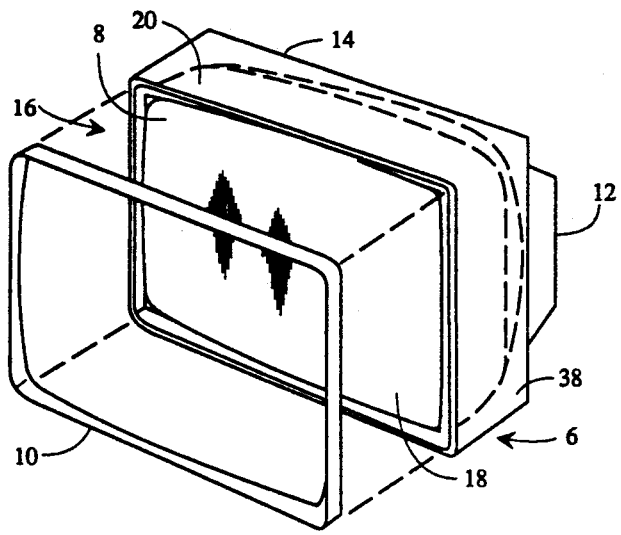
FIG. 1 is a view in perspective depicting the relationship of a cathode ray picture tube, an escutcheon, and the cabinet in which the tube is installed.

There is depicted in FIG. 1 a television receiver cabinet 6 in which is mounted a substantially rectangular picture tube 8, the contours of which are indicated by the phantom lines. The cabinet is composed of three parts comprising an escutcheon 10, a back section 12, and a center section 14 to which the escutcheon 10 and back section 12 are attached. Escutcheon 10 is shown as exploded from the frontal opening 16 of the center section 14. Escutcheon 10 fits snugly into the frontal opening 16, framing the viewing surface 18 of the face panel 20 of tube 8, and concealing the apparatus for mounting and securing the tube 8 in cabinet 6. Escutcheon 10 and back section 12 are injection molded from polystyrene. To provide necessary strength in center section 14, it is injection molded from counter-pressure structural foam polystyrene.

Figure 2:
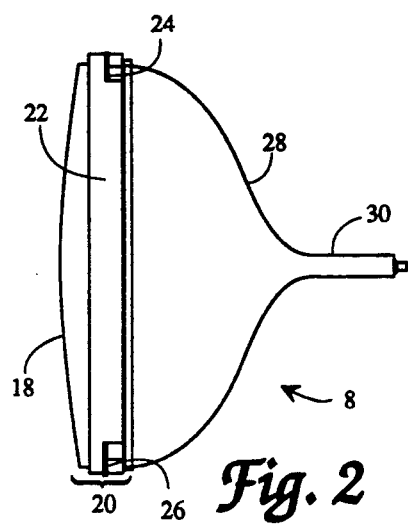
FIG. 2 is a top view of the picture tube of FIG. 1 showing additional details of its configuration.

FIG. 2 depicts additional details of the configuration of picture tube 8. The perimeter of the face panel 20 of tube 8, indicated by the bracket, is surrounded by a tension band 22 made of metal which, by the exertion of an inward force on the perimeter of the face panel 20, can minimize the effects of a tube implosion. Tube 8 is supported in cabinet 6 by four mounting ears which extend from tension band 22; two of the mounting ears 24 and 26 are indicated. Face panel 20 joins with a funnel 28 which terminates in a neck 30 that encloses an electron gun.

Figure 3:
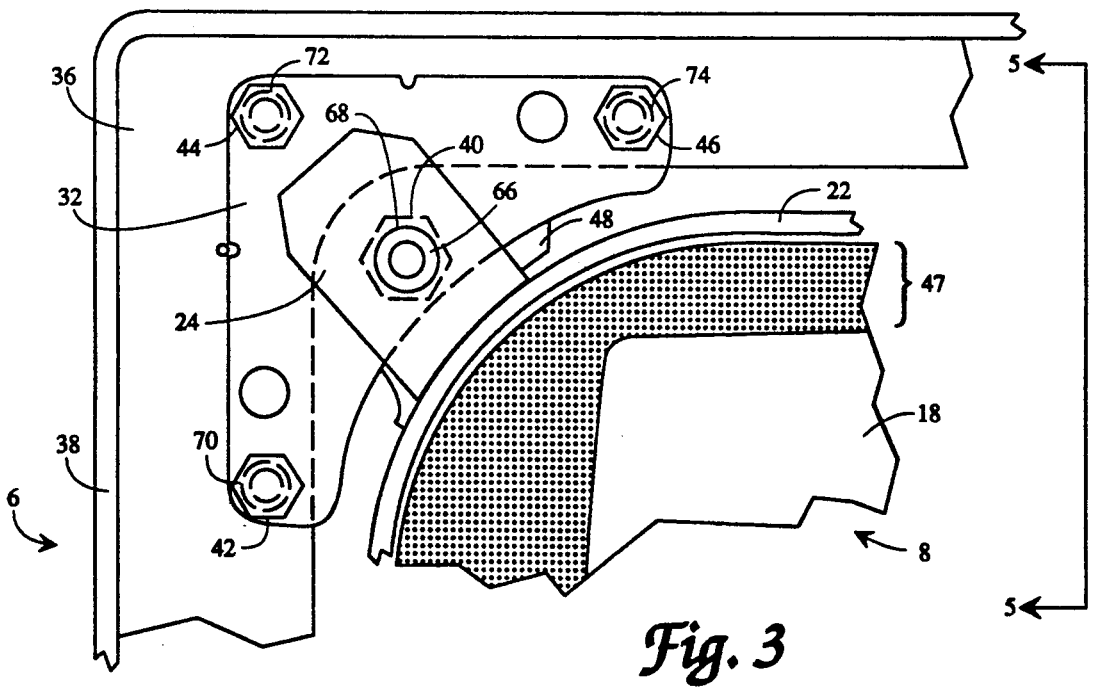
FIG. 3 is a detail view in elevation of a representative corner of the cabinet of FIG. 1 depicting one of the four identical brackets used in mounting a picture tube.

The utilization of one of the four tube mounting ears, mounting ear 24 shown in FIG. 2, is depicted in FIG. 3. The mounting ears in the other three corners of picture tube 8 are identical except for orientation. Tube mounting ear 24 is attached to mounting bracket 32. Mounting bracket 32 is in turn attached to a first flange 36 which extends inwardly from the outer wall 38 of cabinet 6. A second flange also extends inwardly from the first flange, as will be described. Mounting ear 24 is attached to mounting bracket 32 by a hex-head machine screw 40, the details of which will be described. Mounting bracket 32 is shown as being secured to the first flange 36 of cabinet 6 by three hex-head machine screws 42, 44 and 46.

Figure 4:
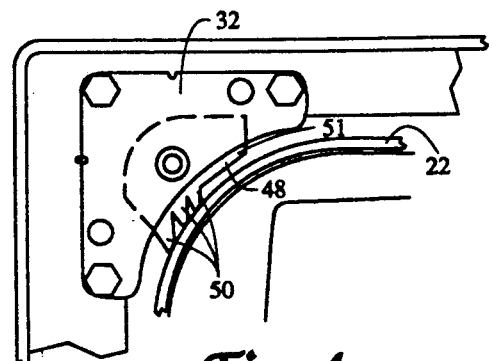
FIG. 4 is a view similar to FIG. 3 showing the location of a face panel centering member according to the invention in relation to the picture tube and the tube mounting bracket.

As shown in FIG. 4, immediately behind mounting bracket 32 is located a centering member 48 according to the present invention, as indicated by the phantom lines. The mounting ear 24 is not shown. Three other centering members having a configuration identical to the centering member 48 are located in each corner of cabinet 6 behind a substantially identical mounting bracket.

The centering member according to the present invention, in conjunction with three identical members located in the corners of a cabinet, provide for the exact centering of the black border 47 that surrounds the viewing surface 18 of picture tube 8 within the escutcheon 10. As noted in the Summary of the Invention, the centering member 48 has a substantially kidney-shaped body.

The centering member 48 depicted in FIG. 4 is shown as being located so as to press against a corner of the face panel. The fingers 50 of the centering member 48 which extend from the body 51 resiliently press against the perimeter of the face panel 20 of tube 8 defined by tension band 22, thereby compensating for variances in the diagonal fit dimensions of the face panel 20. The partial deflection of fingers 50 as they resiliently press against tension band 22 indicate that the installed tube has a diagonal fit dimension defined as one of nominal diagonal measure; that is, one having a diagonal fit dimension between minimum and maximum diagonal measure.

Figure 5:
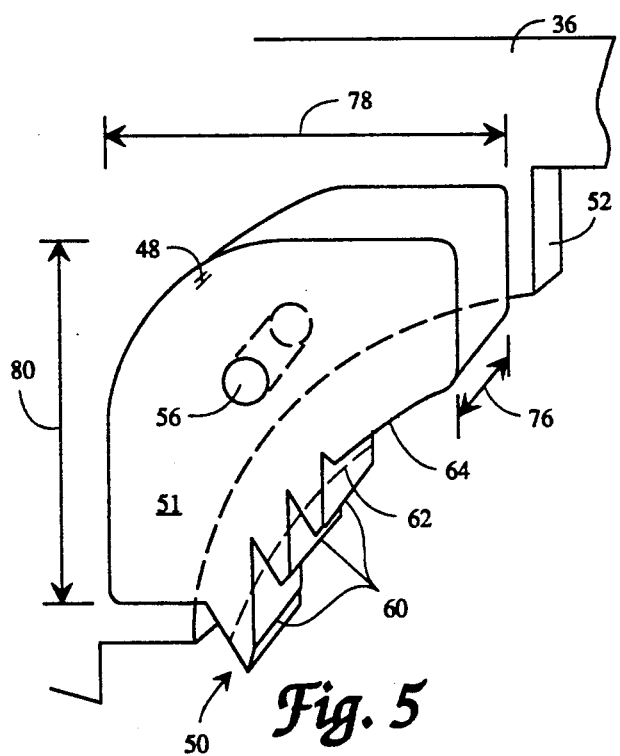
FIG. 5 is a detail view in perspective of a face panel centering member according to the invention.
Figure 6:
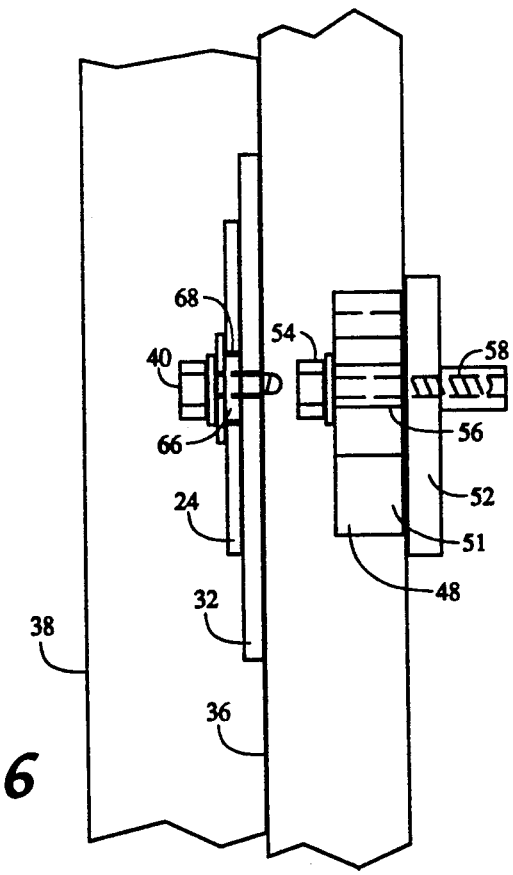
FIG. 6 is a view taken along sight lines 5—5 of FIG. 3 showing the relative locations of a tube mounting bracket and a centering member according to the invention in relation to the cabinet.

FIG. 5 depicts the centering means 48 in greater detail and FIG. 6 shows the relative locations of tube mounting bracket 32 and centering member 48 in relation to the first flange 36. The body 51 of centering member 48 is attached to a second flange 52 which extends from first flange 36, and the centering member 48 extends into the cabinet in the plane of the face panel 20 of tube 8. As indicated in FIG. 6, the body 51 of centering member 48 is attached to second flange 52 by a No. 8 self-tapping washer-head screw 54. Screw 54 passes through hole 56 in the body 51, and as screw 54 is rotated, it cuts threads in a preformed hole 58 in second flange 52. The diameter of hole 56 in the body 51 of centering member 48 is slightly larger than the diameter of the No. 8 screw 54 so as to permit a slight movement of the centering member 48 when a tube is installed.

With reference to FIG. 5, by contact with the periphery of tube 8 which comprises tension band 22, the tips 60 of fingers 50 which extend from the body 51 of the centering member 48, provide for centering tubes having panels of minimum diagonal measure. When centering tubes of nominal diagonal measure, fingers 50 will deflect to the approximate radius 62 indicated by the dash line curve. A ledge 64 of greater radius adjacent to fingers 50 provides for centering tubes of maximum diagonal measure.

The body of the centering member according to the invention has at least three fingers of different length for resiliently pressing against a corner of a face panel. The embodiment 48 depicted in FIGS. 4-6 is shown as having three such fingers. Additional fingers can be provided to facilitate the centering to tubes of larger diagonal measure.

The adjacency of the centering member 48 with mounting ear 24 is shown by FIG. 6. The attachment of mounting ear 24 to mounting bracket 32 is by means of a No. 10 hex-head machine screw which is threaded into mounting bracket 32. A boss 66 that extends from mounting bracket 32 provides for centering mounting ear 24 relative to the mounting bracket 32.

Tolerance for centering a tube in a cabinet is provided by the greater diameter of the various mounting holes in relation t the screws used for the attachments. For example, the diameter of the boss 66 that extends from mounting ear 24 is 0.140/0.144 inch, and the diameter of mounting hole 68 in mounting ear 24 is 0.590 inch. The diameter of each the No. 10 self-tapping screws 42, 44 and 46, which attach the mounting bracket 32 to first flange 36, is 0.190 inch, and the diameter of the holes 70, 72 and 74 in mounting bracket 32 which receive screws 42, 44 and 46 is 0.220 inch. The diameter of hole 56 in the centering member 48 is 0.190 inch and the diameter of the No. 8 self-tapping screw which attaches it to second flange is 0.164 inch. These loose tolerances provide necessary "play" required for centering a tube during manufacture.

The centering member according to the invention is preferably composed of an elastomer such as natural rubber or vinyl having a durometer in the range of 65 to 75, based on a Shore A scale per ASTM D-746. Dimensions of the centering member are dependent upon the size of the picture tube to be installed. For centering a tube of thirty-two inch diameter, the centering member used in each corner of the face panel preferably has the approximate dimensions indicated in FIG. 5; that is, a thickness 76 of 0.50 inch, and a width 78 and height 80 of 1.50 inch. The radius of the tips of the fingers is 1.690 inch and the radius of ledge 64 is 1.844 inch, by way of example. The dimensions of the centering member for picture tubes of larger or smaller diagonal measure can be easily modified to accommodate the different dimensional fit requirements.

As has been noted, the objective of the centering member according to the invention is to center the black border of the face panel in the escutcheon without the necessity of doing so by visual means. Another advantage is that the centering member can also compensate for minor variances in dimensions of the cabinet which may result from warping, or from inaccuracies in the dies used in cabinet molding.

The procedure for mounting and centering a tube in a television receiver cabinet comprises the following steps:

Step 1. Attach the centering means to the first flanges.

Step 2. Attach the mounting brackets to the cabinet.

Step 3. Pick up the tube, using a counterbalance fixture which grasps the viewing surface of the face panel by suction cups.

Step 4. Insert the tube in frontal opening of cabinet, whereby the centering members locate the tube so that the black border on the viewing surface of the face panel is centered within the escutcheon.

Step 5. Tighten the mounting ears on the mounting brackets.

While a particular embodiment of the invention has been shown and described, it will be readily apparent to those skilled in the art that changes and modifications may be made in the inventive means without departing from the invention in its broader aspects, and therefore, the aim of the appended claims is to cover all such changes and modifications as fall within the true spirit and scope of the invention.

We claim:

1. A centering member for centering a rectangular face panel of a cathode ray picture tube in a cabinet, the centering member comprising a body attached to the cabinet and not attached to the escutcheon and extending into the cabinet, the body having at least three fingers of different lengths extending therefrom for resiliently pressing against the perimeter of the face panel, thereby compensating for variances in the diagonal fit dimensions of the face panel.

2. The centering member according to claim 1 wherein the fingers are located so as to press against a corner of the face panel.

3. The centering member according to claim 1 wherein the the fingers resiliently press against a tension band surrounding the face panel.

4. The centering member according to claim 3 wherein the the body is located adjacent to a mounting ear extending from a corner of the tension band.

5. The centering member according to claim 1 wherein the body comprises a ledge adjacent to the fingers for centering tubes of maximum diagonal measure.

6. The centering member according to claim 1 wherein the fingers extend inwardly into the cabinet in the plane of the face panel.

7. Centering means for centering a rectangular face panel of a cathode ray picture tube in a television cabinet, the centering means comprising a plurality of bodies attached to the cabinet and not attached to the escutcheon and extending into the cabinet in the plane of the face panel, each body having at least three fingers of different lengths extending therefrom for resiliently pressing against the perimeter of the face panel and centering tubes of minimum and nominal diagonal measure, thereby compensating for variances in the diagonal fit dimensions of the face panel.

8. The centering means according to claim 7 wherein each body further includes a ledge adjacent to the fingers for centering tubes of maximum diagonal measure.

9. A centering member for use in centering a cathode ray tube (CRT) and especially the face panel thereof within the cabinet of a CRT video device, comprising:
   a) a substantially kidney-shaped body composed of elastomeric material;
   b) the body having a greater curvature and a lesser curvature on opposing sides of the body;
   c) the lesser curvature having a plurality of unequal length fingers extending therefrom; and
   d) whereby, when the centering member is placed within the cabinet, the fingers extending from the lesser curvature, either singly or in combination, may engage the edge of the face panel of the CRT to center the CRT upon insertion of the CRT into the cabinet.

10. The centering member according to claim 9 wherein the the centering member is located so that the fingers resiliently press against the corner of the rectangular face panel.

11. The centering member according to claim 9 wherein the fingers resiliently press against a tension band surrounding the face panel.

* * * * *